United States Patent [19]
Sohn

[11] Patent Number: 5,641,462
[45] Date of Patent: Jun. 24, 1997

[54] CONTINUOUS SOLVENT EXTRACTION WITH BOTTOM GAS INJECTION

[75] Inventor: Hong Yong Sohn, Salt Lake County, Utah

[73] Assignee: University of Utah, Salt Lake City, Utah

[21] Appl. No.: 501,854

[22] Filed: Jul. 12, 1995

[51] Int. Cl.⁶ .................................................. B01D 11/04
[52] U.S. Cl. ..................... 422/257; 422/256; 422/258; 366/107; 366/167.1; 366/173.1; 210/643; 210/151
[58] Field of Search ........................... 422/255, 256, 422/257, 258; 366/101, 106, 107, 167, 1, 173.1; 210/643, 150, 151, 511

[56] References Cited

U.S. PATENT DOCUMENTS

| | | | |
|---|---|---|---|
| 2,588,677 | 3/1952 | Welty et al. | 366/167.1 |
| 3,988,116 | 10/1976 | Robbins | 422/256 |
| 4,307,063 | 12/1981 | O'Brien | 422/256 |
| 4,491,565 | 1/1985 | Verachtert | 422/256 |
| 4,521,117 | 6/1985 | Ouwerkerk et al. | 366/165 |
| 4,594,005 | 6/1986 | Sakamoto et al. | 366/177 |
| 4,715,393 | 12/1987 | Newton | 137/7 |
| 5,048,598 | 9/1991 | Takemae et al. | 165/104.14 |
| 5,076,930 | 12/1991 | Rubin | 210/634 |
| 5,324,109 | 6/1994 | Johari | 366/151 |
| 5,393,429 | 2/1995 | Nakayama et al. | 210/634 |

Primary Examiner—Christopher Kim
Attorney, Agent, or Firm—James L. Sonntag

[57] ABSTRACT

A method and apparatus for solvent extraction where the heavy and light phases are directed counter-currently into vertical mixing zones created by high-strength gas jets injecting gas up through the liquids to create an emulsion plume between the two liquids. The gas jets are at certain intervals along the countercurrent flow paths of the liquids with settling zones on either side of each the mixing zone. The phases disengage in the settling zones, flowing from the mixing zone in opposite countercurrent directions. The system has minimal backmixing, no moving parts, and good contact between phases.

18 Claims, 3 Drawing Sheets

CONTINUOUS SOLVENT EXTRACTION WITH BOTTOM GAS INJECTION

FIELD OF THE INVENTION

This invention relates to solvent extraction processes wherein immiscible phases are contacted and mass is transferred between the phases.

BACKGROUND OF THE INVENTION

Solvent extraction is an efficient method for selectively removing, purifying and concentrating certain elements or compounds from a solution. Two characteristics of the solvent extraction process make it a particularly efficient method of separation: (1) solutes can be selectively removed, and (2) they can be concentrated from a very dilute stream. In some cases, the main purpose is to recover values from mixed solutions, and in other cases, the major purpose is to remove undesired components, including pollutants, from liquid process streams.

There are two types of solvent extraction systems in common use, the mixer-settler system and the pulse or spray column system. The mixer-settler comprises a mixer for each stage for mixing or agitating the phases together to contact the phases. After the mixer, the mixed phases flow into a settler, wherein the phases separate. Mixer-settler units can be operated with a very high degree of contact between the two phases, but suffer from considerable complexity of equipment and operation due to the requirements of impellers for stirring, interstage pumping, and piping. They also require large floor space. They are also difficult to clean and maintain, especially for processing liquids that may be corrosive or particle laden.

Pulse or spray columns are devices where light and heavy phases move counter-currently through a vertical vessel. Pulse and spray columns are simple and without moving parts, but the throughput rates are low and they suffer from severe backmixing, which greatly reduces the extraction efficiency.

OBJECTS OF THE INVENTION

It is, therefore, an object of the invention to provide a solvent extraction system that has a simple design, no moving parts, an enhanced extraction rate, greatly minimized backmixing, and a resulting high extraction efficiency.

It is also an object of the invention to provide a solvent extraction system that requires low manpower for operation and maintenance, and low power and equipment costs.

Further objects of the invention will become evident in the description below.

SUMMARY OF THE INVENTION

An embodiment of the invention is a method for mixing two liquids in two immiscible phases to effect mass transfer between the liquid, the method comprising directing each liquid into a vertical mixing zone of a gas injected up through the liquids to create an emulsion between the two liquids to effect sufficient interfacial contact between the liquids for mass transfer between the liquids, allowing the liquids in the emulsion to disengage into separate phases, and directing liquid in each separated phase in a flow away from the mixing zone. There may be one mixing zone, but, preferably there are at least two mixing zones. In addition, the liquids are preferably directed in a counter-current flow pattern such that the heavier liquid enters each mixing zone from a direction opposite the direction from which the lighter liquid enters the mixing zone.

Another embodiment of the invention is an apparatus for solvent extraction that comprises (a) a vessel for containing the two immiscible liquids in a two-phase system with the less dense liquid overlaying the denser liquid, (b) a means for directing the denser liquid in a flow direction from a first end of the vessel toward a second end of the vessel, (c) a means for directing the less-dense liquid over the denser liquid in a flow direction counter to the flow direction of the denser liquid from the second end of the vessel toward the first end of the vessel, (d) a gas injection means which directs a gas through the two layer liquid system to create a vertical plume in which the phases become intermixed into an emulsion to effect sufficient contact between the liquids for mass transfer between the liquids, and (e) settling zones disposed on either side of the mixing zone for separation of the phases as they disengage from the emulsion.

The present invention is an apparatus and method for liquid/liquid extraction having no moving parts. In summary, gas is injected into the bottom of a vessel to effect mixing of two immiscible phases in a plume during the horizontal countercurrent flow of the phases. The gas jets create a vertical turbulent current to mix the phases, carrying the lower phase into the upper phase and visa-versa. In a typical application, an organic phase containing an extractant flows countercurrently with an aqueous phase in a horizontal vessel. Gas is injected from the bottom at certain intervals to effect the formation of the mixing or plume zones in which mass is transferred between the two phases. The two phases are then separated and flow in opposite directions to enter another plume zone. Several plume zones may be employed sequentially to provide several extraction stages. Overall, the two phases experience minimum amounts of backmixing, and the formation of an emulsion in the plume zone provides a large interfacial area for a high rate of mass transfer between the two phases.

The apparatus of the invention comprises a horizontal vessel divided into a plurality of zones. Every other zone is a mixing zone with a gas injector at the bottom. In the mixing zones, the heavy phase is lifted by the gas jet into the light phase forming an emulsion. The nature of the emulsion is controlled by the strength of the gas jet relative to the depths of the liquid layers. On both sides of each mixing zone are settling zones in which the phases are disengaged and travel in opposite directions.

DETAILED DESCRIPTION OF THE INVENTION

Figure 1:
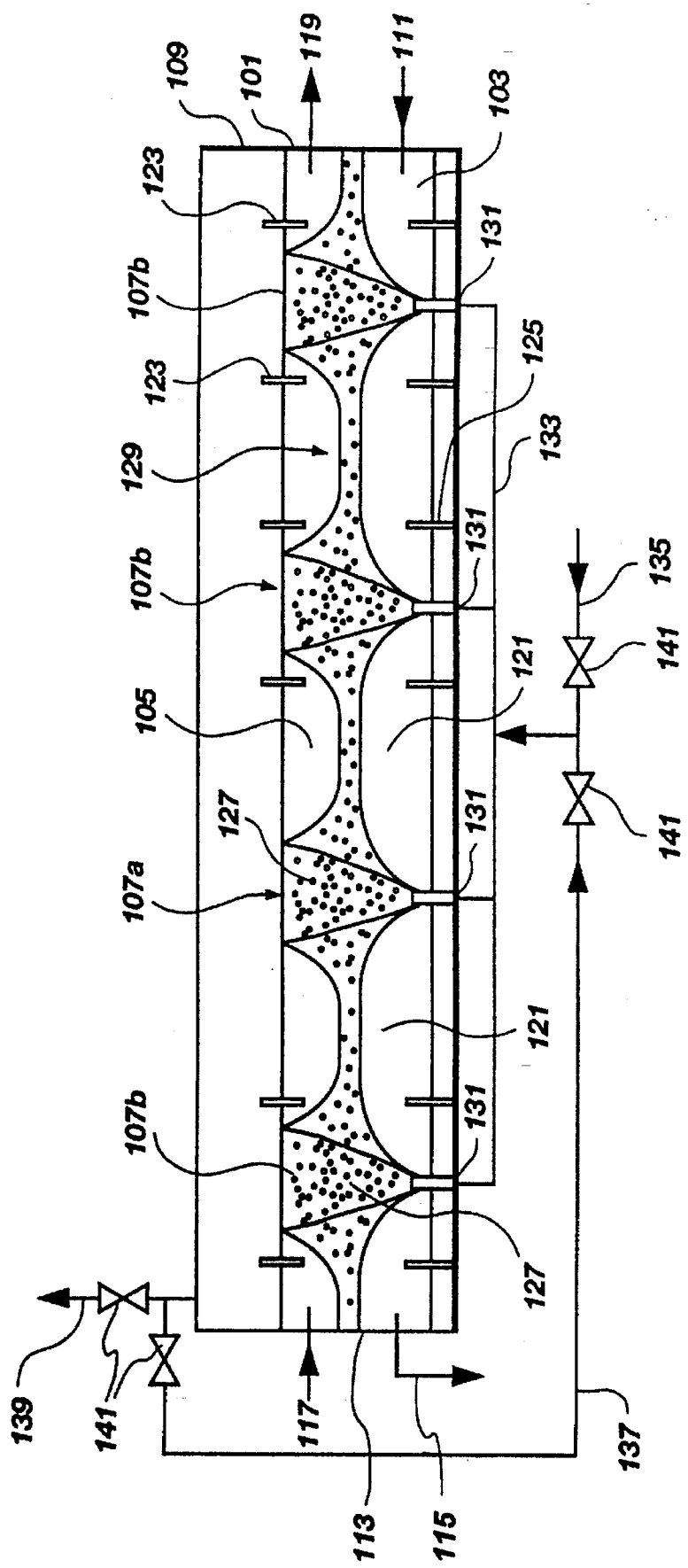
FIG. 1 is a schematic diagram of an apparatus of the invention.

Referring to FIG. 1, which is a schematic diagram of an apparatus of the invention, a generally horizontal vessel 101 contains liquids in two phase layers, a heavy phase layer 103 with an overlying light phase layer 105. In a typical application, the heavy phase 103 is an aqueous solution, and the light phase 105 is an organic solvent containing an extractant.

The apparatus comprises a plurality of mixing zones 107a, 107b. Two kinds mixing zones are illustrated, a mixing zone 107a without baffles, which is shown in detail in FIG. 2a, and a mixing zone 107b with baffles. In the illustrated embodiment, the vessel is generally horizontally disposed and elongated with mixing zones place in a linear fashion along the center axis of the vessel. The width of the vessel is dimensioned to accommodate the width of the emulsion plume, i.e., mixing zone, while minimizing back-flow or bypass-flow along the sides. Other configurations are contemplated, as long as the appropriate flow and depths of the phases are accommodated. Possible alternatives include mixing zones in a ganged or matrix configuration with a wider vessel. In addition, the gas injection may be through a linear injector, to provide a wide mixing zone for a wide vessel.

Figure 2:
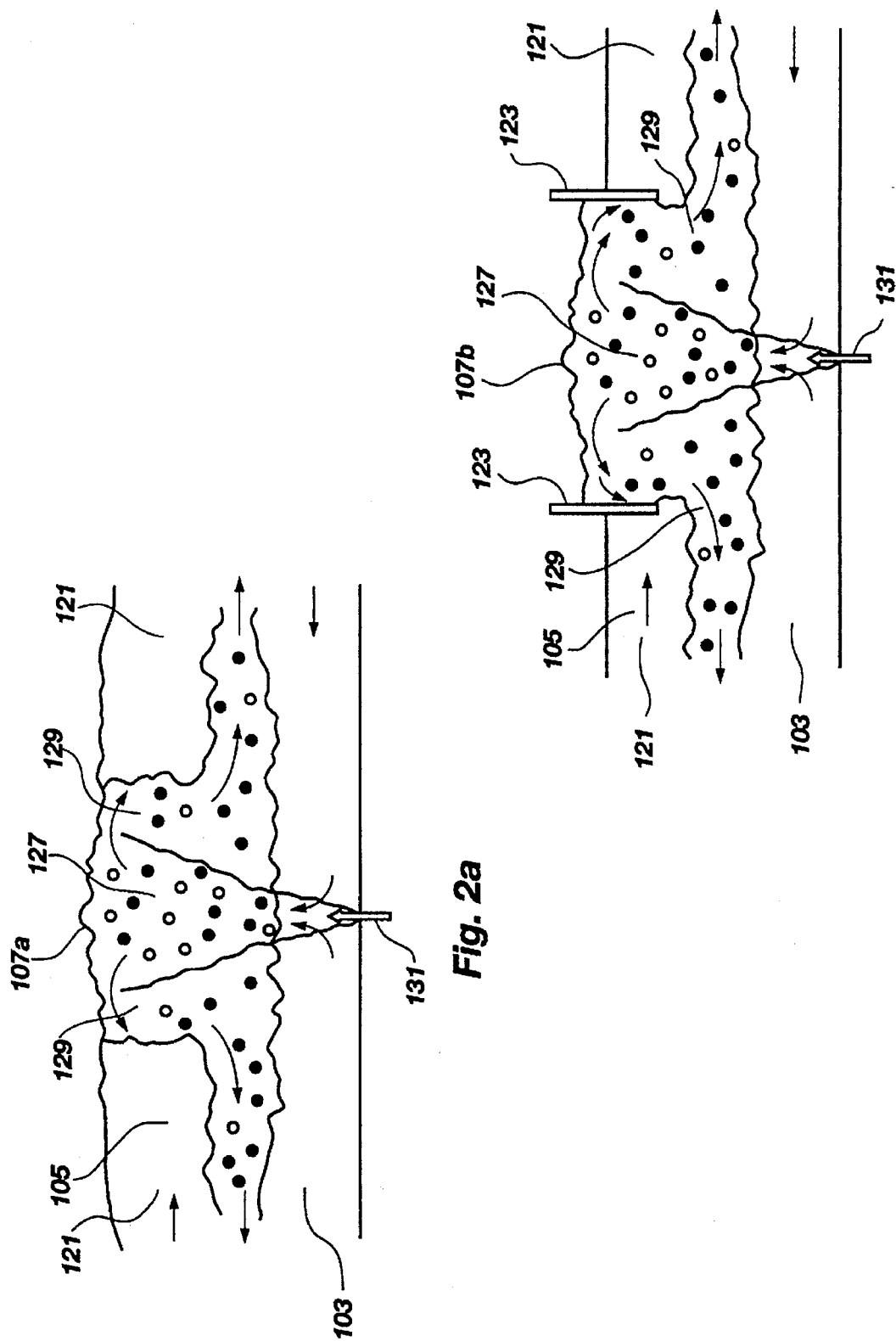
FIGS. 2a and 2b are each a detail views of a mixing zone and adjacent settling zones, FIG. 2a without baffles, and FIG. 2b with baffles.

Referring to FIGS. 1, 2a, and 2b, the heavy phase is introduced at the first end 109 of the vessel through line 111 and flows in a general flow from the right to the left toward the second end 113, at which it is directed from the vessel through line 115. The light phase is introduced into the vessel at the second end through line 117 and directed from the vessel through line 119 at the first end. The flow of the light phase is generally from the left to the right, i.e., in a countercurrent flow to the heavy phase. As the liquid phases flow adjacently to each other, the heavier liquid below the lighter liquid, they pass through the mixing zones 107a, 107b in which the phases are mixed to effect mass transfer between the phases.

Referring particularly to FIG. 2a and 2b, the mixing zone 107a, 107b is formed by injecting a gas through an injector 131 up through the liquids. The gas-jet creates a turbulent mixing effect that emulsifies the immiscible liquids, creating an emulsion plume 127 of emulsified liquids and air bubbles. The plume emulsion has a very large interfacial area between the liquids for mass transfer between the phases. An emulsion, as used herein, is a dispersion of one liquid phase as droplets into the other continuous liquid phase. Either the light or the heavy liquid phase may be the continuous phase, depending upon the respective interfacial properties.

The gas may be air or an inert gas. The gas may be collected at the top of the vessel and recycled to the gas injectors. This eliminates solvent loss by evaporation and also prevents mist problems. Thus environmental pollution is minimized and there are no exit gas streams that are vapor or mist laden and have to be treated. In FIG. 1 are shown gas supply lines 133 to the injector, which are fed from a fresh gas feed line 135 and a recycle line 137 which recycles gas from the top of the vessel. A gas outlet 139, and appropriate valves 141 are provided to maintain a constant gas supply.

The heavy phase approaches the mixing zone in layer 103 from the right (FIGS. 1, 2a, and 2b), and as it nears a gas-jet 131 it is carried upwards into the light phase in a turbulent motion. The light phase approaching in the layer 105 from the left is likewise caught into the turbulent motion created by the gas-jet and the emulsion is formed as plume 127 above the gas jet. The emulsion spreads laterally out from the turbulent plume 127, forming a layer 129 between the heavy and light phases essentially of emulsion phase with some stray air bubbles from the turbulent plume 127. The heavy and light liquids of the emulsion disengage into the heavy and light phase layers 103,105 respectively, and follow the flow of the respective layers, i.e., the heavy to the left and the light to the right.

The mixing zones 107a, 107b are spaced sufficiently far apart horizontally that there exists settling zones 121 therebetween. The spacing is sufficient to have settling zones that allow the liquids in the emulsion phase 129 to spread into the settling zones 121 and there disengage to separate into respective phase layers 103,105. As illustrated in FIG. 1, two adjacent mixing zones may share a settling zone between the mixing zones. The spacing between the mixing zones should be sufficient to prevent back-flow of phases between the mixing zones counter to the flow of the phase.

The present invention is believed to be adaptable to essentially any system of solution used in solvent extraction. For example, for copper extraction, the light phase may be a LIX extractant in an organic solvent, such as kerosene, with an aqueous solution for the heavy phase. The invention may be used to extract copper from a dilute aqueous solution into the organic phase, and then the organic phase can be stripped of copper to form a concentrated aqueous copper solution. Other potential applications include, but are not limited to, separation of plutonium from spent reactor fuel, extract uranium from ore and its purification, the removal of fission products from liquid wastes, treatment of industrial byproduct streams to extract metals, such as zinc, gold, radioactive materials, and recovery of stainless-steel pickling liquors. The process of the invention is particularly useful in recovering metal form dilute solutions, such as zinc from spent HCl pickle liquor, effluent from rayon manufacturing, and zinc electroplating rinse water; copper from silver refining electrolytes, from ammoniacal etching solutions, and from sulfuric acid copper pickling liquor; nickel from plating baths and rinse waters; Cr, Hg, and other metals, and $HNO_3$, HF, and nitrates from various streams.

The extent of extraction can be controlled by adjusting the process variables, i.e., the gas flow rate, depth of the phase and the flow rates of the heavy and light liquids. The present system is essentially a countercurrent-flow staged system where each mixing zone with adjacent settling zones is a stage, and is subject to known mathematical modeling of countercurrent staged systems. The stage efficiencies, number of stages and the optimum flow rates to achieve a particular extraction efficiency can be determined by routine experimentation.

The flows of the liquids in the immiscible phase layers are preferably generally counter-current relative one to the other. It is generally recognized in the art that extraction efficiencies can be much higher with counter-current flow, as opposed to co-current flow. In simplified terms, this can be explained in that the extracted phase stream with the highest concentration of solute is contacted with the extracting phase with highest solute concentration. The stripped extracted phase, with little solute, is contacted with clean extracting phase. Where backflow or backmixing of the phases can be prevented, the extracted phase with low solute concentration is not contacted or mixed with any phase of high solute concentration. In contrast, in cocurrent flow, the extracted phase with lowest concentration is contacted with the extracting phase with the highest concentration. While counter-current flow is greatly preferred in the present invention, co-current or various cross-current flow schemes are contemplated where process and equipment constraints deem such appropriate.

In FIGS. 1, and 2b, baffles 123 are suspended in the liquid to inhibit or constrain the lateral spread of the turbulent plume in the mixing zone. This inhibits backmixing and permits a smaller horizontal area for the mixing zone, and allows the mixing zones to be placed closer together. Baffles 125 (FIG. 1) may also be placed at the bottom of the vessel to direct flow in the mixing zones. In addition to, or in place of the baffles, coalescence aides may be incorporated into the apparatus if such is needed for a certain combination of solution and extractant to promote phase disengagement. For example, low-velocity gas bubbles introduced from the bottom of the settler zone may promote disengagement and also serve as flotation step for the organic phase.

Example

An apparatus of the invention was constructed comprising a horizontal vessel with four air injectors. The vessel had a circular cross-section and the dimensions of 30 cm in diameter and 2.4 m long.

The heavy phase was an aqueous solution of copper with an initial concentration of 512 mg/l and pH of 2.15. The light phase was a high flash-point kerosene containing 2 wt. % LIX 860. LIX 860 is one of a number of known copper extractants that are commercially available. The diameter of the injectors was 7/23 in. (0.5556 cm). The gas flow rate was 2 SCFM (38.9 m/s). The flow rate of the heavy or aqueous phase was 0.25 l/min. The flow rate of the organic or light phase was 0.25 l/min. The height of the organic phase in the vessel was 1.5 inches (3.81 cm). The height of the aqueous phase in the vessel was 1.5 inches (3.81 cm).

Figure 3:
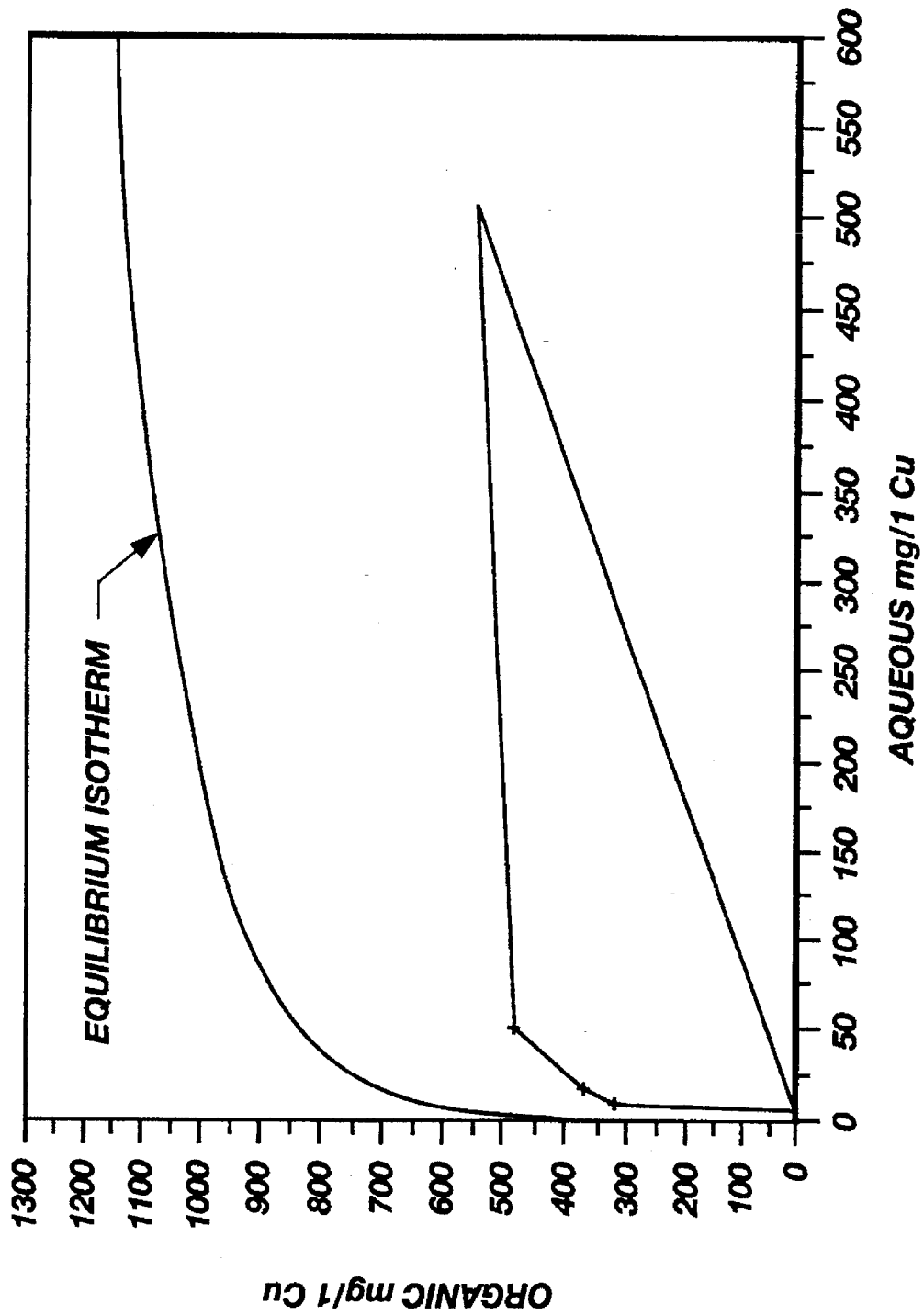
FIG. 3 is a graph displaying data from a test run of a method of the invention.

The results are summarized in Table I. The data in Table I are also shown in the graph in FIG. 3. In the table, the mixing zones are numbered from the end at which the aqueous phase in introduced. The concentrations were measured for solutions as they left the mixing zones.

TABLE I

| | Solvent Extraction with Air Injection | | | | | |
|---|---|---|---|---|---|---|
| | | Mixing Zone | | | | |
| Cu (mg/l) | Aqueous feed | 1 | 2 | 3 | 4 | Organic Feed |
| Aqueous Phase | 512 | 54.5 | 23.2 | 9.08 | 3.9 | — |
| Organic Phase | — | 534 | 482 | 360 | 317 | 0 |

The initial copper concentration was reduced from 512 mg/l to about 4 mg/l. The efficiency of the mass transfer in the plume generated by the bottom gas injection is very good, based on the fact that, after the first state, the concentrations of the exit streams have approached the equilibrium value reasonably closely. This can be seen by reference to FIG. 3, which also shows the equilibrium isotherm for this system.

An apparatus was constructed similar to that in the above example, except that the vessel was 1 m in diameter and 7.2 m in length. The reactor was tested for backmixing and flow properties. The results that were obtained indicate that extraction efficiencies with the larger unit would be similar to that of the smaller unit.

In a separate test of solvent extraction kinetics within a single plume mixing cell generated by bottom gas injection, a specific interfacial area of 2000 $m^2/m^3$ of aqueous phase was measured. This compares with 100 to 1000 $m^2/m^3$ for a typical solvent extraction emulsion generated by mechanical stirring.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method for mixing two immiscible phases of a less dense liquid layer overlaying a dense liquid layer to effect mass transfer between the liquids comprising directing each liquid horizontally into a vertical mixing zone of a gas injected up through the liquids to create an emulsion between the two liquids to effect sufficient interfacial contact between the liquids for mass transfer between the liquids, allowing the liquids in the emulsion to disengage into separate phases in adjacent settling zones, directing each separated phase in a horizontal flow from the mixing zone.

2. The method of claim 1 wherein there are at least two mixing zones.

3. The method of claim 1 wherein there is one mixing zone.

4. The method of claim 1 wherein the liquids are directed in a counter-current flow pattern such that the denser liquid enters each mixing zone from a horizontal direction opposite the horizontal direction from which the less dense liquid enters the mixing zone.

5. The method of claim 1 wherein the gas injected up through the liquid is thereafter collected and reinjected up through the liquids to create the emulsion zone.

6. The method of claim 1 wherein baffle means are disposed to constrain the horizontal extent of the emulsion in the mixing zone, but do not materially inhibit disengagement of the emulsion and the flow of each liquid from the disengagement zone.

7. A method for continuously transferring mass between two immiscible liquids of differing density comprising;
 (a) providing a vessel for containing the two immiscible liquids in a two phase system with a less dense liquid overlaying a denser liquid,
 (b) directing the denser liquid in a flow direction from a first end of the vessel toward a second end of the vessel,
 (c) directing the less-dense liquid over the denser liquid in a flow direction counter to the flow direction of the denser liquid from the second end of the vessel toward the first end of the vessel,
 (d) mixing the phases by directing a gas through the two layer liquid system in a mixing zone to create a vertical plume in which the phases become intermixed into an emulsion to effect sufficient contact between the liquids for mass transfer between the liquids, and
 (e) allowing the liquids to separate in settling zones disposed on either side of the mixing zone into separate phases as the intermixed phases disengage from the emulsion.

8. The method of claim 7 wherein there are at least two mixing zones.

9. The method of claim 7 wherein there is one mixing zone.

10. An apparatus for solvent extraction that comprises
 (a) a vessel for containing two immiscible liquids in a two phase system with a less dense liquid overlaying a denser liquid,
 (b) a gas injection means which directs a gas through the two phase system in a mixing zone to create a vertical plumes in which the phases become intermixed into an emulsion to effect sufficient interfacial contact between the liquids for mass transfer between the liquids, and (e) settling zones disposed on either side of the mixing zone for separation of the phases as they disengage from the emulsion.

11. The apparatus of claim 10 wherein there are at least two gas injection means to provide two mixing zones.

12. The apparatus of claim 10 wherein there is one gas injection means to provide in one mixing zone.

13. The apparatus of claim 10 additionally comprising a means for directing the liquids in a counter-current flow pattern such that the heavier liquid enters each mixing zone from a direction opposite the direction from which the lighter liquid enters the mixing zone.

14. The apparatus of claim 10 additionally comprising means for collecting the gas injected up through the liquid and a means for directing the collected gas to the gas injection means.

15. The apparatus of claim 10 additionally comprising baffle disposed to constrain the horizontal extent of the emulsion in the mixing zone, but not to materially inhibit disengagement of the emulsion and the flow of each liquid from the disengagement zone.

16. A method for continuously transferring mass between two immiscible liquids of differing density comprising;

(a) providing a vessel for containing the two immiscible liquids in a two phase system with a less dense liquid overlaying a denser liquid, (b) directing the denser liquid horizontally into a mixing zone, (c) directing the less-dense liquid horizontally into the mixing zone, (c) directing a gas up through the two layer liquid system in the mixing zone to create a vertical plume in which the phases become intermixed into an emulsion to effect sufficient contact between the liquids for mass transfer between the liquids, (e) providing settling zones adjacent to the mixing zone where the liquids become disengaged from the emulsion.

17. The method of claim 16 wherein the denser liquid and the less-dense liquid are directed in counter-current directions and two separate settling zones are on opposite sides of the mixing zone.

18. The method of claim 17 wherein there are multiple mixing zones in the vessel with settling zones disposed between the mixing zones.

* * * * *